Figure 1:
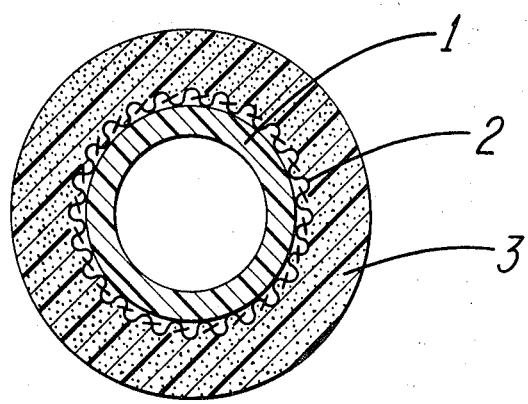

United States Patent

[11] 3,547,162

| [72] | Inventor | Andre Jacques Schaerer<br>22 Sangglenstrasse, Pfaffhausen,<br>Switzerland |
|---|---|---|
| [21] | Appl. No. | 600,747 |
| [22] | Filed | Dec. 12, 1966 |
| [45] | Patented | Dec. 15, 1970 |
| [32] | Priority | Dec. 13, 1965 |
| [33] | | Switzerland |
| [31] | | No. 17,127/65 |

[54] SYNTHETIC PLASTIC PIPES
8 Claims, 2 Drawing Figs.

[52] U.S. Cl. ............................................... 138/125,
138/124, 138/126, 138/137, 156/149
[51] Int. Cl. ....................................................... F16l 11/04,
F16l 1/08
[50] Field of Search ............................................... 138/124,
125, 137, 178; 156/(Inquired); 161/(Inquired)

[56] References Cited
UNITED STATES PATENTS

| 2,690,769 | 10/1954 | Brown............ | 138/125 |
| 2,873,226 | 2/1959 | Davies............ | 138/Fiber Digest |
| 2,879,803 | 3/1959 | Francois......... | 138/Cellular Digest |
| 2,959,508 | 11/1960 | Graham.......... | 138/Cellular Digest |
| 3,175,586 | 3/1965 | Tatsch............ | 138/137 |
| 3,253,619 | 5/1966 | Cook.............. | 138/125 |
| 3,266,527 | 8/1966 | Ross............... | 138/125 |
| 3,310,447 | 3/1967 | Matthews........ | 138/125X |
| 3,332,447 | 7/1967 | Holmgren........ | 138/125 |
| 2,826,570 | 3/1958 | Ivett............... | 138/Cellular Digest |
| 2,849,028 | 8/1958 | Clark.............. | 138/Cellular Digest |
| 3,056,171 | 10/1962 | Fite................ | 161/Polyethlene Digest |

FOREIGN PATENTS

| 379,118 | 8/1964 | Switzerland.................. | 138/125 |

OTHER REFERENCES

Publication: "Heating, Piping & Air Conditioning," Vol. 33, No. 1, Jan. 1961, pp. 182-186. Article Title: "Glass Reinforced Plastic Piping," Copy in class 138 Glass Fiber Digest.

*Primary Examiner*—Herbert F. Ross
*Attorney*—Gordon W. Hueschen

ABSTRACT: A synthetic plastic pipe especially adapted for use as a hot water conduit, having an inner liner of a synthetic plastic selected from the group consisting of cross-linked olefinic polymers and copolymers, an intermediate layer comprising a braided layer of fibers, and an outer layer of a flexible plastic foam.

PATENTED DEC 15 1970

3,547,162

INVENTOR
ANDRÉ J. SCHAERER
BY
Talivaldis Cepuritis
ATTORNEY

SYNTHETIC PLASTIC PIPES

A synthetic plastic pipe of cross-linked olefinic polymers and copolymers surrounded by a braided jacket and a further jacket of synthetic plastic foam.

Flexible or rigid synthetic plastic pipes and conduits offer appreciable advantages for delivering fresh or waste water. They are corrosion resistant, inexpensive, thermally insulating, odorless and tasteless, resistant to aging, physiologically harmless, and, further, are easily laid. Flexible polyethylene pipes, which can be hand bent without heating and laid in concrete, particularly offer advantages for installing in buildings. Unfortunately, polyethylene pipes of this kind are not suitable for carrying hot water having a temperature of from 60°—95° C., because they have insufficient resistance to pressure and are liable to stress corrosion. With the exception of fluorocarbon polymers and their mono and dicholor substituted derivatives, when thermoplastics remain in contact with hot water over a prolonged period of time they change their physical and chemical properties because of decomposition. The degree of decomposition is greatly influenced by the temperature of the water and the length of time that the thermoplastic is in contact with the water. A pipe of polyethylene exposed to the temperature of 60° to 100° C. in a dry atmosphere undergoes scarcely any change, even over a prolonged time period, whereas in the presence of water the synthetic plastic suffers marked changes in its physical and chemical properties after even a short period of time. Since hot water is also under continuous pressure, whereby the walls of the pipe are placed under a tangential pressure, there is an appreciably increased danger with molecular decomposition that tension cracks or stress corrosion will develop.

Suitable cross-linked polymers or copolymers of olefins for the manufacture of the synthetic plastic pipes of the invention can be obtained in accordance with the method described in Swiss Pat. Nos. 381,858 and 379,118.

It has been determined surprisingly that the prolonged exposure of pipes of cross-linked olefinic polymers or copolymers to hot water causes no detectable change in the physical and chemical properties of the synthetic plastic. A further advantage is that the olefinic polymers and copolymers, modified by crosslinking, show virtually no stress cracking, so that the new synthetic plastic pipes can be laid bent to small radii of curvature.

In accordance with the invention, advantageously but not necessarily a pipe of the noncross-linked polymer is extruded over the inner pipe which, since it will be in direct contact with the hot water, consists of a cross-linked polyolefin, particularly polyethylene or polypropylene, or of a cross-linked olefinic copolymer, such as a copolymer of ethylene-propylene, ethylene-vinylacetate, or ethylene-methacrylic acid ester.

Figure 2:
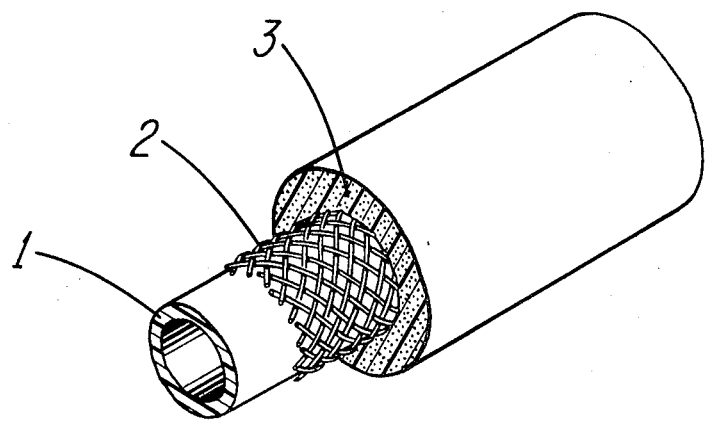

FIG. 1 represents a transverse section of the pipe structure according to the invention and FIG. 2 represents a perspective view of a portion of the pipe partly broken away and showing the several layers of the constituents thereof.

Referring to FIG. 1 and FIG. 2, a pipe according to the present invention is shown comprising an inner tube 1, a reinforcing layer 2 of braided fibers and an outer layer or jacket 3 of an extruded synthetic flexible plastic foam.

Although the long term tensile strength in dependence on time at 100° C. of such a pipe of cross-linked olefinic polymers or copolymers is several times that of a pipe of noncross-linked synthetic plastic, in accordance with the invention the safety factor and resistance to stress caused by bending is increased by surrounding the pipe with a braided jacket of natural, semisynthetic, or synthetic fibers having a high tensile strength. Suitable fibers, for example, are glass, cellulose, and cotton fibers, or synthetic fibers such as nylon fibers.

Pipes made of the above-noted synthetic plastic have 6 to 8 times the thermal expansion of iron pipes. Hot water in houses is only intermittently drawn, so that the hot water pipes are subjected to constant variations in cross section and length. When th pipes of the invention are laid in cement, mortar, or plaster, the pipes, in order not to interfere with their free expansion, are surrounded by a soft elastic jacket of foam of synthetic plastic having preponderantly closed cells. The thickness of the jacket is at least equal to that of the cross-linked pipe, and preferably 3 to 5 times thicker.

Suitable foams are, for example, expanded urethane, or synthetic plastics such as polyethylene or plasticized PVC mixed with an expanding agent, such as azodicarbonamide. The jacket is preferably extruded, wherein polyethylene or a copolymer of the ethylene, for example, is mixed with a customary expanding agent, causing the synthetic plastic, when out of the extruder, to expand accompanied by the formation of predominantly closed cells.

The braided pipe is then carried through a crosshead die whereby the foamed jacket is being extruded over the braided pipe by a method commonly used in the cable industry. Once the tool is removed, the synthetic plastic expands into a soft elastic foam.

The foam jacket is preferably applied in such a way, that the foam penetrates the interstices of the braiding and contacts the surface of the pipe.

When the pipe is laid in concrete, for example, the foam jacket permits the pipe to expand without being subjected to stress.

The invention is not to be construed as limited to the particular forms disclosed herein, since these are to be regarded as illustrative rather than restrictive.

I claim:

1. Synthetic plastic pipe embedded in a rigid building material matrix, particularly intended for hot water and which is substantially dimensionally stable radially with change of temperature due to said embedment, including an inner pipe of synthetic plastic selected from the group consisting of cross-linked olefinic polymers and copolymers, and intermediate reinforcing layer comprising a braided jacket of natural, semisynthetic, or synthetic fibers, and an outer layer of elastomeric synthetic plastic foam surrounding said braided jacket, having a thickness not less than that of the inner pipe wall, wherein the outside diameter of the foam remains substantially constant with changes in temperature.

2. The synthetic plastic pipe as defined in claim 1, wherein said braided jacket is made of glass fibers.

3. The synthetic plastic pipe as defined in claim 1, wherein said braided jacket is made of cellulose fibers.

4. The synthetic plastic pipe as defined in claim 1, wherein said braided jacket is made of synthetic fibers.

5. The synthetic plastic pipe as defined in claim 1 wherein said synthetic plastic foam jacket penetrates the interstices of said braided jacket and contacts the outer surface of said pipe.

6. The synthetic plastic pipe as defined in claim 1, wherein said inner pipe is made of synthetic plastic selected from the group consisting of polyethylene, polypropylene, and copolymeres of ethylene-propylene, ethylene-vinyl acetate, and ethylene-methacrylic acid ester.

7. The synthetic plastic pipe as defined in claim 1, wherein said inner pipe is jacketed by a second pipe of synthetic plastic selected from the group consisting of noncross-linked olefinic polymers and copolymers.

8. A multilayer synthetic plastic pipe structure for hot water distribution according to claim 1, wherein said inner tube is formed of cross-linked polyethylene, and said outer layer is formed of a soft, elastic foamed polyethylene, the wall thickness of said outer layer being 3 to 5 times greater than the wall thickness of said inner tube.